United States Patent [19]

English

[11] 4,121,097
[45] Oct. 17, 1978

[54] PHOTOELECTRICALLY CONTROLLED LINE FOLLOWER APPARATUS

[75] Inventor: James English, Eastbourne, England

[73] Assignee: BOC Limited, London, England

[21] Appl. No.: 813,343

[22] Filed: Jul. 6, 1977

[30] Foreign Application Priority Data

Jul. 8, 1976 [GB] United Kingdom ............... 28549/76

[51] Int. Cl.² .............................................. G05B 1/00
[52] U.S. Cl. .................................... 250/202; 318/577
[58] Field of Search .................. 250/202, 205, 214 R, 250/216; 318/577

[56] References Cited

U.S. PATENT DOCUMENTS

| 3,335,281 | 8/1967 | Willits | 250/202 |
| 3,517,167 | 6/1970 | Bell | 250/205 |
| 3,970,840 | 7/1976 | De Bruine | 318/577 |

Primary Examiner—David C. Nelms
Attorney, Agent, or Firm—Dennison, Dennison, Meserole & Pollack

[57] ABSTRACT

A photoelectric follower for following centers or edges of lines to control associated cutting torches produces a sharply-defined edge-of-line signal by making the 'black' and 'white' level signals of equal amplitude and opposite polarity. The follower has adjustable 'lead' and a kerf width adjustment. Line scanning is effected by a piezoelectric rod.

5 Claims, 3 Drawing Figures

PHOTOELECTRICALLY CONTROLLED LINE FOLLOWER APPARATUS

BACKGROUND OF THE INVENTION

1. Field of the Invention

This invention relates to photoelectrically controlled apparatus for following a line or edge so as to control the movement of one or more associated cutting tools positioned over a steel plate or other workpiece to be cut.

The line or edge is usually provided by a drawing fixed to a horizontal table positioned below the follower, although it may be the actual seam to be welded, or an offset line on the workpiece. The follower may be mounted on a boom carrying tools in the form of one or more gas-fuelled cutting torches, in which case there is a 1:1 ratio between the drawing and the path traced out by the or each cutting torch. Alternatively, the drawing may be on a reduced scale of say 1:10, and the follower is separate from the torch(es), which is or are constrained to move at 10 times the speed at which the follower moves over the drawing, so that the path followed by the or each torch is 10 times the size of the drawing, to give so-called 'ratio-tracing'.

2. Description of the Prior Art

In photoelectrically-controlled line followers, with which the present invention is concerned, an optical image of the line being followed is oscillated across a photoelectric cell to produce an electric signal which is modulated in accordance with the variation in the amount of light reflected from the drawing as the point-of-scan of the follower oscillates in a plane substantially perpendicular to the axis of the line. As the follower is driven along the line; by the selective energisation of two 'coordinate' motors controlled by the signal from the photoelectric cell, the point-of-scan traces out a substantially sinusoidal curve. The signal generated when the follower is scanning a white surface is compared with the signal generated from a black surface to give an 'error signal' indicative of the relative dispositions of the center of the scan from either the centre or a selected edge of the line being followed. This error signal is then used to control the drive motors so as to reduce the error signal to substantially zero. Thus the line follower is servo-controlled.

In practice no surface is perfectly white, i.e. it does not reflect all the incident light, but absorbs some of it; nor is any surface perfectly black, but always reflects some incident light. By 'white' in this specification and claims is meant any pale surface which reflects more than 1.5 times the amount of light reflected from a dark ('black') surface from which it is separated by a relatively well-defined boundary. The word 'light' in this specification and claims means radiation having a wavelength in that part of the electromagnetic spectrum to which the photocell is sensitive. In the case of the so-called 'dye-line' prints, normal visible light is reflected with a significant contrast from the white and black areas of the print. However, photoelectric cells are usually more efficient at converting to electrical signals radiation in the infra-red part of the spectrum than in the visible part. It so happens that, in most normal dye-line prints, in the infra-red range the reflectance of the white and balck areas of the print is almost identical so that, as far as the photoelectric cell is concerned, the lines of the print are invisible: they present a less-than-acceptable contrast with the background of the print.

SUMMARY OF THE PRESENT INVENTION

The present invention aims at providing a line or edge follower which produces a clear signal when the point-of-scan crosses a black/white boundary.

Accordingly, the present invention provides a photoelectric line follower including a body rotatable about a given axis and adapted to carry at one of its ends at least one source of light to shine light on a plane that in use contains a surface on which is a line to be followed and which is intended to intersect the said axis externally of the body; optical means positioned on or within the body for collecting light reflected from the surface and directing it to scanning means for causing the light to be oscillated across the face of a photoelectric transducer so that, in effect, the optical axis of the optical means is oscillated transversely to the line being followed; circuit means for altering the light output of the or each source of light to cause the transducer to produce a signal of chosen amplitude and polarity when the said surface is wholly white, and bias-charging means for altering the electrical bias of the photoelectric transducer to cause it to produce a signal of the same amplitude but opposite polarity when that part of the said surface which intersects the optical axis is wholly black.

For convenience, in this specification and claims whenever the word "line" is used alone it is intended to encompass also an edge within its meaning; elsewhere, the phrase "line or edge" is used.

According to a further feature of the present invention, there is provided a line follower including a rigid, fixed, support having two interconnected parts mounted in bearings in the support for joint rotation about a vertical axis, the lower part carrying an optical system and the upper part being keyed to the lower part and adapted to be rotated incrementally about the axis to keep the plane of scan perpendicular to that portion of the line being followed which intersects the rotational axis.

According to a still further feature of the present invention, there is provided a photoelectric line follower in which an optical element throws an image of part of the line being followed on a mirror carried at the free end of a piezoelectric bender rod extending at a small angle to the optical axis, the mirror being arranged to reflect the image onto a photoelectric cell fixed relatively to the fixed end of the rod.

BRIEF DESCRIPTION OF THE DRAWINGS

The present invention will now be described, merely by way of example, with reference to the accompanying drawings, in which.

DESCRIPTION OF THE PREFERRED EMBODIMENTS

Figure 1:
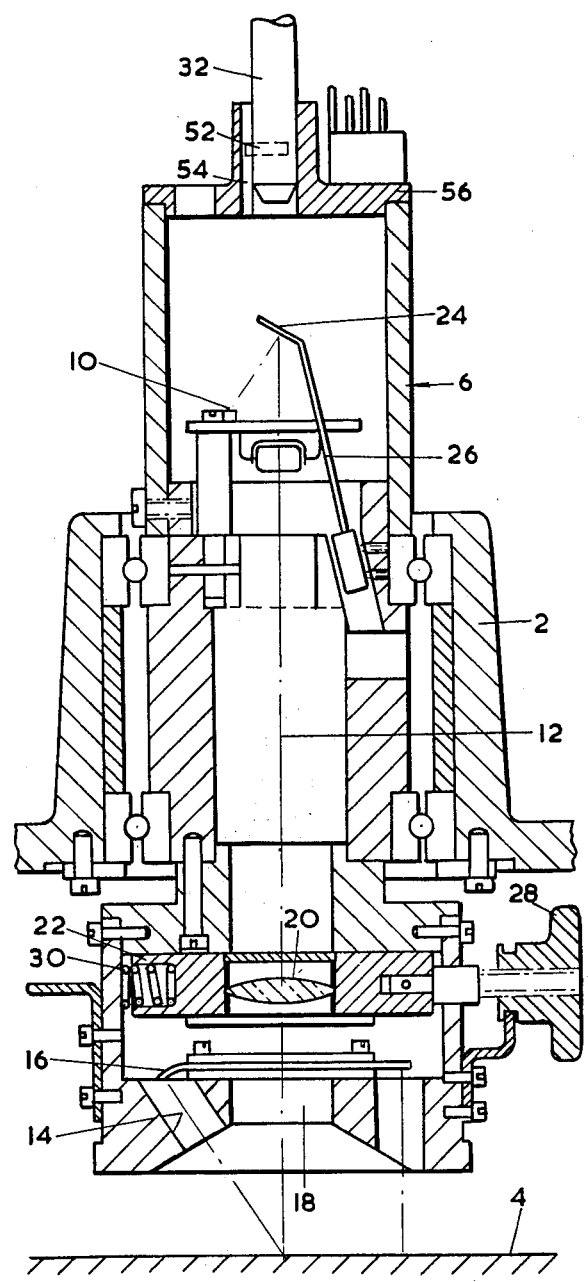
FIG. 1 is a view, partly in section and partly in elevation, of the lower end of a line follower apparatus according to the present invention.
Figure 2:
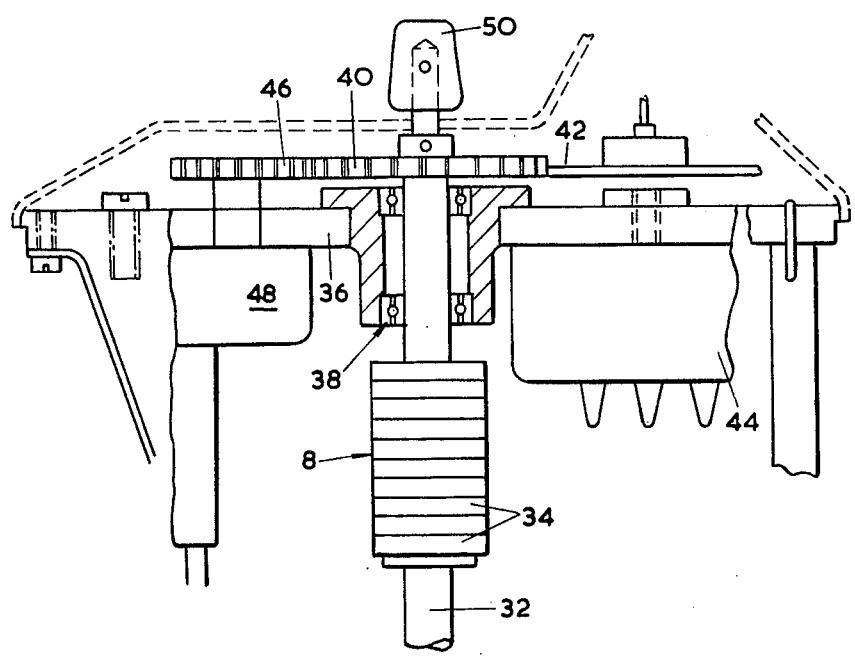
FIG. 2 is a view similar to FIG. 1 but of the upper end of the line follower.

The line follower shown in the accompanying drawings has a fixed support 2 arranged to be directly carried by a member (not shown) which is movable over the whole area of the horizontal table 4 on which is positioned or drawn the line or edge to be followed. This movement of the line follower is in use controlled by two electric motors (not shown) effecting movement of the line follower in two mutually perpendicular directions so that movement of the line follower in any direction, or along a curve, is effected by selective energisation of the two motors. These motors may be the same as, or different from, whose which drive a boom carrying associated gas-fuelled cutting torches (not shown), when the invention is used with a cutting machine used for steel plates or like workpieces. However, the line follower of the present invention can be used for driving any associated tool, and is not limited to being used with cutting torches.

Positioned in the support 2 are the rotary parts of the line follower, consisting of a lower part 6 and an upper part 8. The lower part 6 carries means for illuminating the line being followed, and optical members for causing an image of the line to fall on the photo-sensitive areas of a photo-electric cell 10.

The upper part 8 carries the electromechanical means for rotating the lower part for reasons which will be described in greater detail below.

Both the upper and lower parts are rotatable about an axis 12 which is vertical when the apparatus is in use. That portion of the drawing on table 4 where it intersects axis 12 is illuminated by several electric lamps positioned at the lower end of part 6. Each lamp is seated in a sloping aperture 14 and has its terminals contacted by a resilient contact 16, with all the contacts being connected in common to a source of adjustable voltage.

Light reflected from the table 4 or drawing passes through a window 18 and falls on a lens 20 carried by a slidable carrier or slide 22. The light incident on lens 20 is refracted and directed to a mirror 24 carried at the free end of a rod 26 of piezoelectric material constructed to act as a bender, so that when an alternating voltage of appropriate frequency is applied across the rod the free end oscillates at a chosen speed and in a fixed plane. Light reflected from mirror 24 is arranged to fall on the photoelectric cell 10. The arrangement is such that, when the rod 26 is energised, a focussed image of that part of the line which is being followed falls on the cell 10. Because the light reflected from the drawing varies in intensity as the cell effectively scans across the boundary between the line being followed and the background of the drawing, these variations give rise to a modulated electric signal from photocell 10. By means which are not patentable in themselves, and hence are not described herein in any further detail, the signal from cell 10 is analysed and acted on to control the subsequent translational and rotational movements of the line follower so as to ensure that the axis 12 is always coincident with either the centre or a selected edge of the line being followed.

The purpose of the slide 22 supporting lens 20 is to compensate for the width of the kerf being cut by the associated torches. This is necessary because this width is always finite, and because the drawing being followed normally represents the desired shape of the periphery of the workpiece being cut. The kerf width compensator effectively introduces a distortion of adjustable size into the optical path of the line follower, so that the torches are always displaced by a chosen amount and in a chosen direction so that one of the edges of the cut produced by the torch accurately reproduces the shape of the drawing, irrespective of the actual width of the kerf produced by the torch. This adjustment is provided by the slide 22, which can be moved perpendicularly to axis 12 under the action of a rotary knob 28, the slide 22 being urged towards the knob by means a compression spring 30 so as to take up any backlash or lost motion in the force-transmitting path between slide 22 and knob 28. The effect of moving slide 22 in a direction perpendicular to the line being followed is to cause the coordinate drive motors to move the line follower bodily in the same direction as the slide is moved, and by a corresponding amount, so as to restore the optical image to its position relative to the photoelectric cell. This physical movement of the line follower is translated into a corresponding movement of the associated cutting torches so that the desired compensation for the kerf width is provided.

As can be seen from FIG. 1, the rod 26 extends at a relatively small angle to axis 12 to ensure that, as the mirror 24 is oscillated, it has a virtually negligible effect on the focussing of the line image on cell 10.

The rod 26 oscillates in a plane oriented such that the cell 10 effectively 'sees' an illuminated point which oscillates perpendicularly to the boundary or central axis of the line being followed. When the line follower is working, the resultant point-of-scan of the photoelectric cell traces out a sinusoidal curve. The effective plane-of-scan of the photocell 10 is displaced by a small fixed or adjustable distance forwardly of the rotational axis of the line follower, to give a so-called 'lead'. The associated electronic circuitry (not shown) effectively times incremental portions of the scan of the photocell so that it spends as much time on one side of the line as it does on the other. Because of this lead, the rotational axis still intersects the line while the cell is scanning a curve. The resultant inequality in the times spent by the scan on both sides of the line causes signals to be produced to rotate the follower in the direction restoring the equality. By thus responding to the curvature of the line in advance of the rotational axis, the axis is enabled to follow the line very accurately.

The upper part 8 of the line follower includes a shaft 32 carrying a set of slip-rings 34 engaged by brushes (not shown) enabling electric power and signals to be supplied to, or conducted from, the electric equipment carried by the lower part of the line follower. The shaft 32 is rotatably mounted in a cover plate 36 by means of bearings 38. Projecting from above the cover plate 36 is a spur gear 40 with which meshes a gear-wheel 42 driving a sine-cosine potentiometer 44. The potentiometer produces signals indicating the instantaneous orientation of the shaft 32 relative to a fixed reference point.

The gear 40 is also engaged by a gear-wheel 46 driven from a gear box 48 giving fine control of the absolute angular position, or speed of rotation, of shaft 32.

The upper end of shaft 32 ends in a knob 50 by means of which the shaft can be rotated manually when it is necessary to align the shaft with the socket at the upper end of the lower part of the line follower, when connecting the two parts together.

As indicated in FIG. 1, extending radially from the lower end of shaft 32 is a key 52 fitting into an internal spline 54 at the upper end of the lower part of the line follower, although other means could be used for coupling the two parts together non-rotatably. The key 52 is a tight angular fit in the spline, so that there is virtually no lost angular motion between the shaft 32 and part 6 of the line follower.

Positioned on the cover plate 56 of part 6 are three electrical plugs intended to be engaged by sockets (not shown) electrically connected to the slip-rings 34 by flexible cables. In this way, the mechanical interconnection of parts 6 and 8 can be effected separately from their electrical interconnection, for ease of assembly and dismantling.

The most delicate part of the line follower of the present invention is the lower part 6, and particularly the oscillating rod. By virtue of the construction just described, the two parts of the follower can be easily separated axially from each other without in any way disturbing the lower part 6, or subjecting it to such vibrations or shocks that the rod is broken or damaged. When the cover plate 36 is removed, the potentiometer 44, gear box 48, the slip-ring assembly 34, and the sockets for transmitting power or signals to or from the lower part 6, are removed as a body, so that the relative settings thereof are not disturbed.

Figure 3:
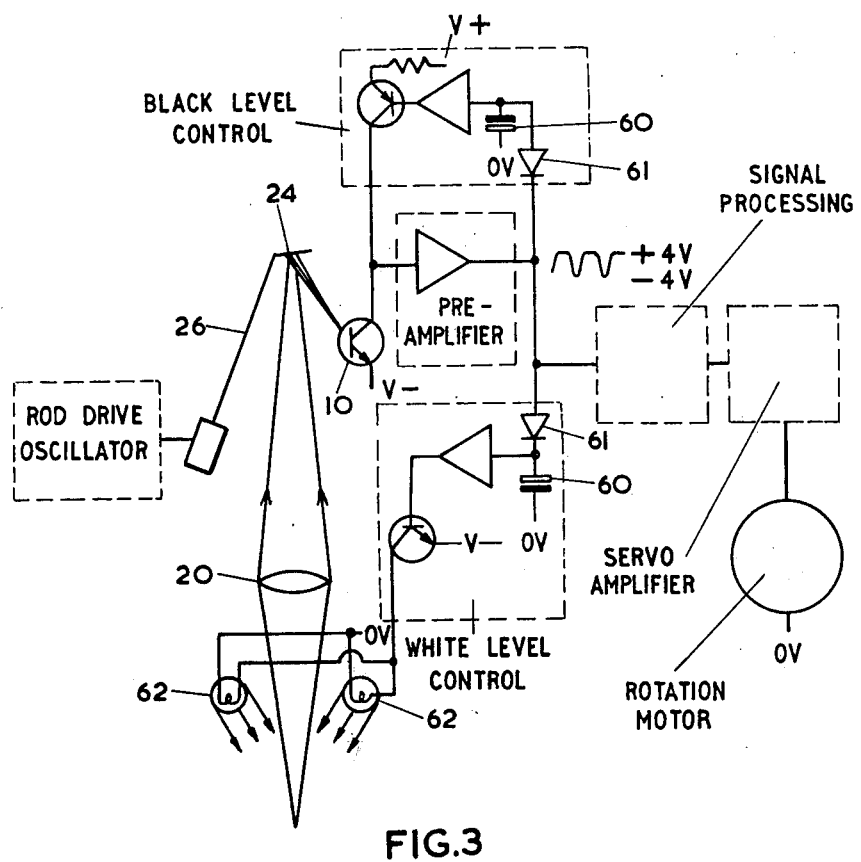
FIG. 3 is an electrical block diagram of the circuitry and electrical components embodied in the line follower shown in FIGS. 1 and 2.

When the area of the drawing effectively seen by the photoelectric cell 10 is wholly white, it produces a maximum signal from the cell. In one form of the present invention, this signal is arranged to be +4V. When the area being scanned is wholly black, i.e. when the optical axis intersects the line, the signal produced by cell 10 is at a minimum. In one form of the present invention, this signal is arranged to be −4V. The amplitude of each of these two signals is arranged to be controlled by the state of an associated capacitor 60 in the associated electrical circuitry (FIG. 3). Thus, when the follower comes across a dirty part of the drawing, which in effect reduces the whiteness of the drawing a diode 61 is caused to conduct current so that the respective control capacitor becomes charged to a value at which the signal is restored to its desired maximum. This is done by the capacitor being connected in a circuit controlling the current passing through the illuminating lamps 62. Under the conditions just mentioned, more current passes through these lamps until they become bright enough for the signal from the white part of the drawing to reach its desired value of +4V. Conversely, when the background of the drawing is particularly white, resulting in a signal from cell 10 of more than +4V, the output of the lamps is reduced until as much light falls on the cell 10 as is necessary to produce the desired level of +4V.

When the black part of the line is blacker than the level for which the follower is set, the voltage of the respective part of the control circuit would tend to become more negative than the desired minimum of −4V. When this happens, the respective control capacitor has its charge altered so as to alter the electrical bias on the photocell 10 sufficiently to limit the negative-going excursion of the signal to −4V. A variation of the 'blackness' in the opposite direction, i.e. the line becomes paler, causes converse alterations with the same end result.

By ensuring that the white and black signals are of equal amplitude and opposite polarity, the instant at which the point-of-scan crosses the boundary of the line is indicated by the voltage of the respective part of the control circuit passing through zero. The rapid transition from black to white ensures that there is a precise time at which the signal passes through zero. This is of particular value when following the edge of a line or the boundary of a silhouette. With the aid of accurate timing circuits, responses from the opposite edge of a line may be ignored, so that a line is treated as if it were a silhouette. Then, with the centre-of-scan on one edge of a line, exactly-equal portions of the same period are spent in the 'black' and in the white areas of the drawing. When any departures from this condition come about, as by the line changing direction, the resultant imbalance between the white and black signals or, in other words, the production of an error signal which is not zero, is detected and caused to control both the motor rotating the line follower, and also the coordinate drive motors, so as to move the centre-of-scan of the follower back over the selected edge of the line. This translational movement of the line follower is reflected by similar movements of each of the associated cutting torches so that they remain constrained to follow a path of which one edge is dictated by the drawing being followed.

The control of the lamp brightness and of the photocell bias current are not independent, in that altering the brightness of the lamps affects the amount of light reflected from the black areas of the drawing, and conversely when the photocell bias current is altered. This interaction between the two control systems could cause oscillations or 'hunting'. To prevent instability, it is necessary to keep the gain of the servo loop low, and to provide a wide separation between the frequency response of these two systems. The white level control has an inherently slow response, because of the time taken for the filaments to respond to alterations in the heating current. The separation of the two responses is therefore ensured by giving the black level control the shortest response time commensurate with smoothing of the resultant rectified signal.

When the line follower is initially approaching a line, it produces a constant white signal with no significant modulation. In this condition, the white and black signal level controls cannot function normally, and a low frequency oscillation between the two levels would be possible. It is therefore necessary to control the bias and gain conditions of both black and white signal controls so that, in the absence of modulation, provided that a sufficient amount of light is received, the monitoring output signal is kept at +4V. These restrictions mean that the operating conditions must be kept within reasonable bounds, i.e. there must always be more than a threshold level of illumination; the range over which the photocell can be adjusted is limited, and there must be sufficient contrast between black and white signals, which in practice means that the black:white signal ratio must be better than 1:1.5.

It will be appreciated that the follower as described operates normally to follow an edge-of-line. However, the circuits of the follower can be modified so as to follow the centre-of-line. When so modified, an 'on line' signal is generated only when the scan crosses both sides of the line. This inhibition of the 'on-line' signal is necessary to allow for the case when the follower is initially approaching a line on the drawing at low speed. If an 'on-line' signal were generated immediately one side of the line was detected, the follower could swing round towards the line and, with a rapid response, could swing through 90° before straddling the line. This could result in the follower following the line in the wrong direction. This would be important because of the kerf-width compensation would thus be in the wrong direction, so that the cutting torches would be cutting into the required areas of the workpiece, instead of leaving them outlined. To prevent this from happening, when an edge-of-line is first detected no 'on-line' signal is produced until the second edge-of-line is detected.

When following a centre-of-line, the range of scan of the follower is significantly greater than the width of the line, so that the follower generates white signals at each limit of scan, and generates a black signal at the centre of scan.

It will thus be seen that the present invention provides a line follower which is able to follow accurately either an edge-of-line or a centre-of-line, and which is mounted in such a way that the mechanically fragile part of the follower can have the driving part of the follower removed therefrom without being subjected to excessive vibrations or shocks.

What is claimed is:

1. A photoelectric line follower for following a line on a surface disposed in a plane, comprising a body rotatable about a given axis and adapted to carry at one of its ends at least one source of light to shine light on said plane, said line intersecting the said axis externally of the body; scanning means; a photoelectric transducer; optical means secured to the body for collecting light reflected from the surface and directing it to the scanning means for causing the light to be oscillated across the face of said photoelectric transducer so that the optical axis of the optical means is oscillated transversely to the line being followed; wherein the improvement consists in the provision of circuit means for altering the light output of the lamps to cause the transducer to produce a signal of chosen amplitude and polarity when the said surface is wholly white, and bias-changing means for altering the electrical bias of the photoelectric transducer to cause it to produce a signal of the same amplitude but opposite polarity when that part of the said surface which intersects the optical axis is wholly black.

2. A line follower according to claim 1 wherein the body is in the form of two mechanically and electrically interconnected parts, bearings for journalling said parts, a rigid, fixed support for the bearings for joint rotation of the parts about said axis, one part carrying the optical means and the other part being keyed to the one part and rotatable incrementally about the optical axis to keep the plane of scan perpendicular to that portion of the line being followed which intersects the said given axis.

3. A line follower according to claim 1 wherein the optical means includes a lens to throw an image of part of the line being followed, a mirror for receiving said image; a piezoelectric bender rod to constitute the scanning means, a free end of said rod carrying said mirror; the rod extending at a small angle to the optical axis, the mirror being arranged to reflect the image on the photoelectric transducer fixed relatively to the other, fixed end of the rod.

4. Line follower according to claim 1 further including a kerf which compensating device supported in said body and movable relative to the body and the said optical axis.

5. Line follower according to claim 1 wherein means are provided to displace the plane of scan relative to said given axis, and said circuit means includes compensating means to ensure that the times of scan on both sides of the line being followed are maintained equal.

* * * * *